United States Patent [19]

Renbarger

[11] 4,090,295
[45] May 23, 1978

[54] APPARATUS FOR ASSEMBLING FORCE-FIT COMPONENTS

[75] Inventor: Romaine L. Renbarger, St. Marys, Ohio

[73] Assignee: The Goodyear Tire & Rubber Company, Akron, Ohio

[21] Appl. No.: 759,302

[22] Filed: Jan. 14, 1977

[51] Int. Cl.² .............................................. B23P 21/00
[52] U.S. Cl. ....................................... 29/789; 29/235; 29/790; 29/822
[58] Field of Search ................ 29/771, 787, 789, 790, 29/809, 822, 235

[56] References Cited

U.S. PATENT DOCUMENTS

| 2,604,692 | 7/1952 | Broden | 29/790 X |
|---|---|---|---|
| 2,803,870 | 8/1957 | Uphoff | 29/235 X |
| 2,824,362 | 2/1958 | Myers | 29/235 |
| 2,853,770 | 9/1958 | Thorn et al. | 29/822 X |
| 3,103,023 | 9/1963 | Zdanis | 29/790 X |
| 3,693,232 | 9/1972 | Mingus | 29/771 |
| 3,959,870 | 6/1976 | Klein | 29/790 |

Primary Examiner—Victor A. DiPalma
Attorney, Agent, or Firm—L. A. Germain

[57] ABSTRACT

A two part shock or vibration mount which comprises an elastomeric member and a metallic member are automatically assembled into an integral one piece unit by feeding the parts on a conveyor in axial juxtaposed relative position into a compressive force device that is mounted above the conveyor at an angle of declination with respect to the conveyed components such that an increasingly progressive compressive force is applied to the juxtaposed components. Upon exiting the force applying device the components are in a force fit engagement one within the other.

11 Claims, 5 Drawing Figures

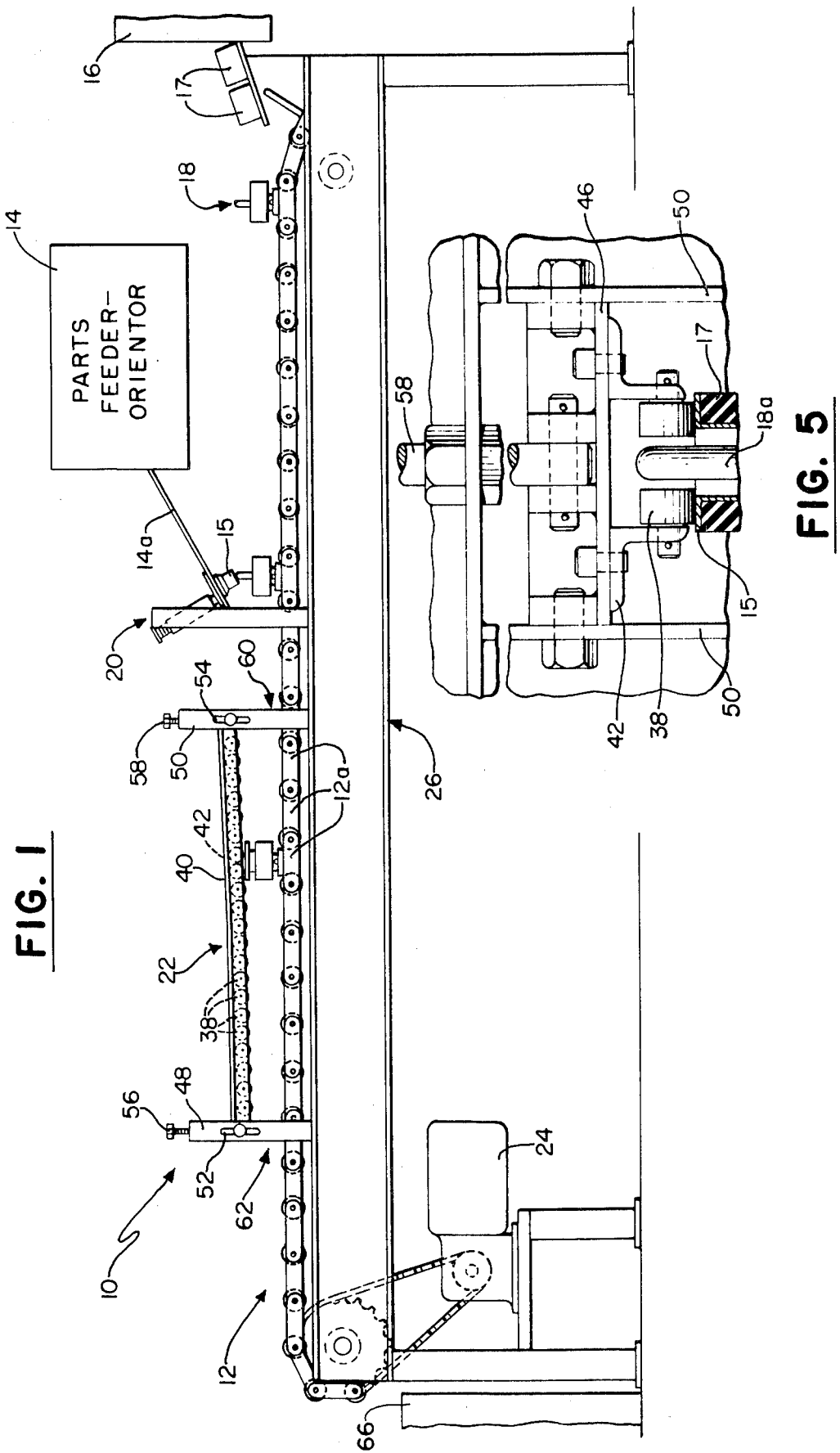

APPARATUS FOR ASSEMBLING FORCE-FIT COMPONENTS

BACKGROUND OF THE INVENTION

This invention relates to assembly apparatus and more particularly to apparatuus for automated assembly of force-fit components. More specifically, the invention is described with respect to apparatus for automaitc assembly of vibration mounts as are used in automotive applications.

There are many and various type vibration and/or shock isolating mounts and most of these include an elastomeric energy absorbing member assembled in combination with a metallic member adapted for attachment to the structure to be vibration isolated. In the automotive industry mounts of the type alluded to are frequently used to shock mount engines, cabs, transmissions, radiators, motors, vehicle seats and the like.

This invention therefore, provides apparatus for continuously and automatically assembling a two-component shock mount comprising an elastomeric member that is force fit into or onto a metallic mounting member. The invention is accomplished in apparatus comprising in combination (a) a continuous conveyor, (b) a parts feeder for supplying metallic members, (c) a parts feeder for supplying elastomeric members, (d) means on the conveyor for carrying the members in relative juxtoposition, and (e) means for supplying a progressively increasing compressive force to the conveyed members to form an integrally assembled unit.

DESCRIPTION OF THE DRAWINGS

The features and advantages of the invention will be better understood from a consideration of the following description when taken in conjunction with the accompanying drawings in which:

FIG. 1 is a side elevational view of the complete apparatus forming the invention;

FIG. 5 is an elevational view of the height adjusting means for the compressive force providing means.

BRIEF DESCRIPTION OF THE INVENTION

Figure 3:
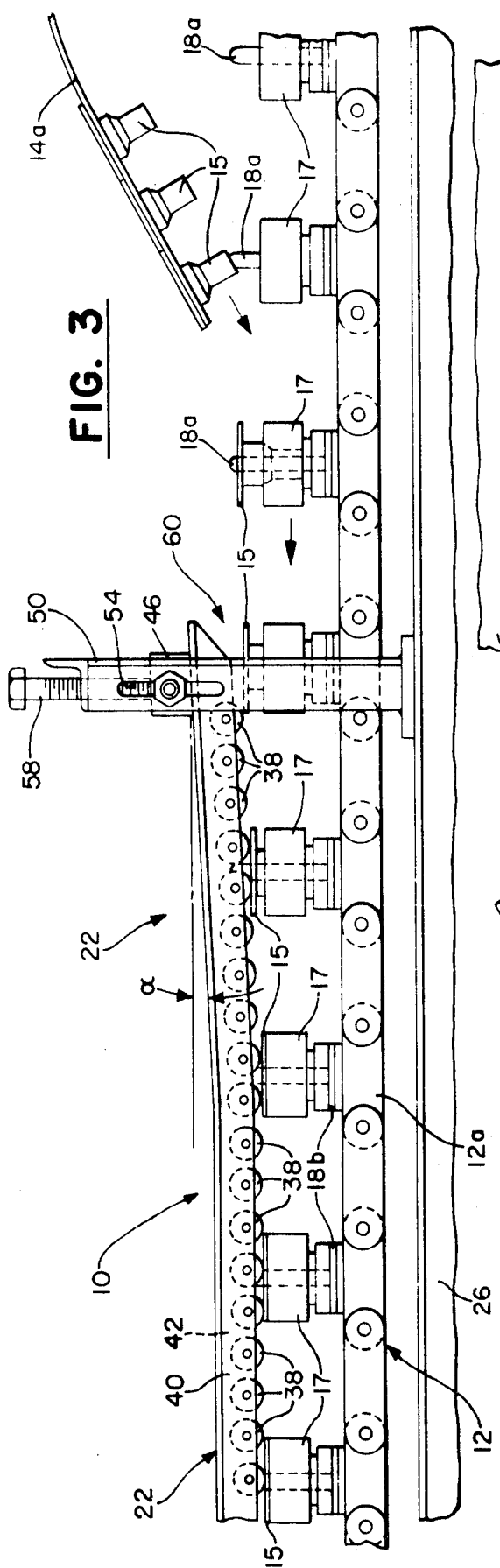
FIG. 3 is a side elevational view of the means providing a progressively increasing compressive force on the conveyed members.

In FIG. 1 an assembly station is generally indicated by reference numeral 10 and comprises a conveyor 12, a vibratory parts feeder/orientor 14 for metallic members 15, a vibratory parts feeder/orientor 16 for elastomeric members 17, means 18 on the conveyor for receiving and carrying the members 15, 17, means 20 mounted relative to the conveyor 12 for positioning the metallic members 15 such that they may be gated and picked up by the conveyor means 18, and means 22 for supplying a progressively increasing compressive force to said members such as to join them into an integrally assembled unit.

The conveyor 12 is a conventional chain link belt comprising a plurality of links 12a forming a continuous loop that is driven by a motor unit 24. The speed of the conveyor is conventionally controlled by various known methods that may include specifying sprocket and pulley diameters, motor speed, and/or gear ratios and all within the skill of knowledgeable persons in the art. The conveyor 12 is of course mounted and carried on a bed 26 that also is adapted for mounting and positioning the various other apparatus comprising the invention.

Figure 2:
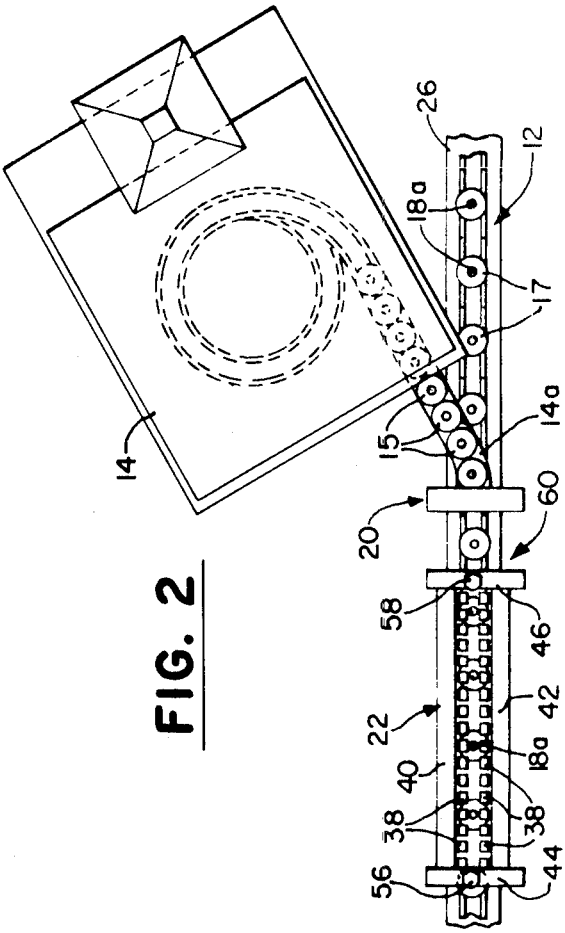
FIG. 2 is a top plan view of vibratory feeder that supplies parts to the conveyor.

The vibratory feeders 14 and 16 are parts feeders of the type manufactured by the FMC Corporation, Material Handling Equipment Division, Homer City, Penn., and are well known and recognized apparatus in the art. As illustrated in FIG. 2, the parts feeder/orientor 14 is adapted to feed the metallic members 15 that comprise one element of a vibration mount onto a track 14a for delivery and positioning relative to the conveyor 12 such that they may be gated by means 20 and successively picked up by the conveyor carrying means 18. The gating means 20 comprises a spring loaded mechanical gate that allows a single member 15 on the feeder track 14a to be engaged by the carrying means 18 and passed therethrough while holding back the next successive member 15 for engagement by the next successive carrying means 18. The parts feeder/orientor 16 is also adapted from a similar FMC apparatus to feed elastomeric members 17 which comprise the second element of the vibration mount and to position these members for pickup by the conveyor carrying means 18. Of course, both of the elements comprising the vibration mount may be hand positioned on the conveyor carrying means 18 by personnel but this would, for the most part, cancel the benefits provided by fully automated feed and pickup apparatus that are well known and within the cabability of the art.

Figure 4:
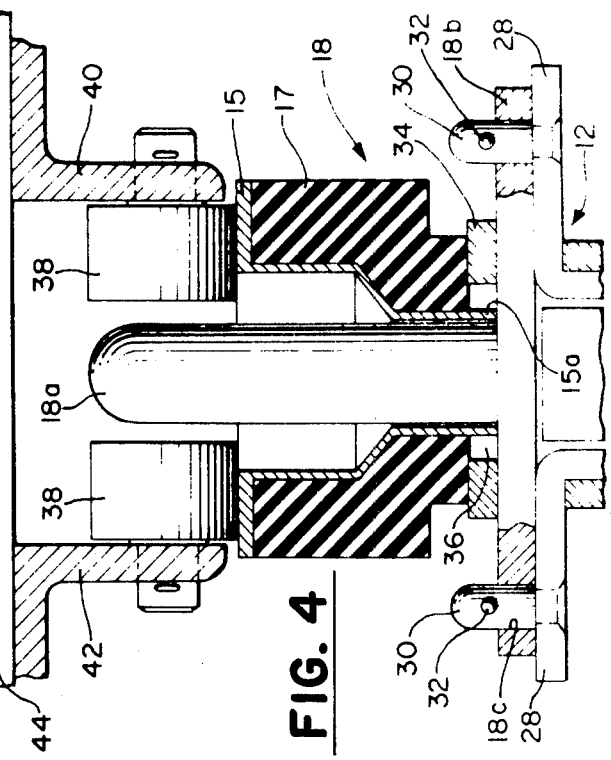
FIG. 4 is an enlarged frontal view of the pin assembly that carries the members on the conveyor.

The conveyor 12 is adapted for carrying the vibration mount elements 15, 17 by reason of the carrying means 18 which comprise a plurality of pins 18a attached at regular intervals to the links 12a forming the conveyor chain belt. Referring to FIG. 4, each pin 18a is attached to a plate 18b having holes 18c therein for receiving fastening studs 30 that are attached to a plate 28. The plate 28 is bolted or otherwise secured to the structure forming the chain link. To maintain the plate 18b on the chain link, a pair of hitch pins 32 are snapped through holes in the studs 30. Of course, the studs 30 may also be in the form of threaded bolts or the like or any other type fastening means within the art but an advantage of the embodiment shown is that it provides for quick changeability of the pin assembly when required. For example, the pin mount also comprises a collar 34 that is adapted for receiving various configurations of the vibration mounts members 15, 17. As illustrated in FIG. 4, the axial relationship between a metallic member 15 and an elastomeric member 17 is such that a recess 36 must be provided for receiving the extended length of the metallic member as indicated at 15a. Therefore, for various configurations of vibration mounts, different pin diameters and/or collar arrangements may be required. In this circumstance, the pin mountings should be easily removed from the chain link and exchanged for others to facilitate assembly of different configurations of vibration mounts by the apparatus.

The means 22 for supplying a progressively increasing compressive force to the members 15, 17 will be described with reference to FIGS. 1, 3 and 4. As illustrated in the drawings, the means 22 comprises a plurality of cam rollers 38 mounted on channel members 40, 42 that are positioned along the conveyor track such that the pins 18a follow a path between opposing cam rollers on either side of the track. The channels 40, 42 are tied together at their ends by cross members 44, 46 and suspended over the conveyor by vertical uprights 48,50. The vertical uprights 48,50 are adapted for adjustment of the vertical height of the cam rollers over the conveyor track by slots 52,54 at either end and by vertical adjusting bolts 56,58 that are positioned at each end and at the center of the cross members 44,46. Now therefore, the entrance end of the assembly is generally indicated by reference numeral 60 while the exit end is generally indicated by reference numeral 62 and as clearly shown in the drawing of FIG. 3, the entrance end is positioned at a higher vertical height than the exit end. The angle α of declination from the entrance end to the exit end is generally under 10 degrees and in the drawing is shown as being approximately 3°–4°.

In the operation of the herebefore described apparatus, elastomeric members 17 are individually picked up from the parts feeder 16 by each of the conveyor pins 18a, moved down the conveyor toward the parts feeder 14 whereupon metallic members 15 are picked up by the action of the pins 18a to mate in an axially relative position with respect to the elastic element on the pin. The axially aligned members then enter the high end of unit 22 whereupon a progressively increasing downward compressive force is exerted on the metallic member as it proceeds toward the exit end of the unit 22. The progressive compressive force meets its limit toward the exit end and is adjusted so that the metallic member is firmly seated in the elastomeric member 17. Upon exiting the unit 22, the completely assembled vibration mounts are dropped off of the pins 18a and into a collection bin 66.

Thus, it must be appreciated from the preceeding description that the apparatus is a continuously running assembly of two part vibration mounts that requires nothing more than maintaining the parts feeders 14, 16 full of the members to be assembled. Various controls may be positioned along the conveyor track to shut down the conveyor in the absence of parts. For example, sensors may be positioned at the exit point of the parts feeder track to sense the presence of parts on the track. In the absence of, for example, a metallic member 15 on the track 14a, a signal may be initiated that will stop the conveyor.

While certain representative embodiments and details have been shown for the purpose of illustrating the invention, it will be apparent to those skilled in this art that various changes and modifications may be made therein without departing from the spirit or scope of the invention.

What is claimed is:

1. Appartus for force-fit assembly of a two component unit comprising:
   A. an endless conveyor;
   B. carrying means mounted on the conveyor at regular intervals along the length of the conveyor for accepting and carrying components;
   C. a first parts feeder positioned relative to the conveyor for feeding a first one of the components to the carrying means on the conveyor;
   D. a second parts feeder positioned relative to the conveyor for feeding the second of the components to the carrying means on the conveyor such that said second component is juxtopositioned with respect to the first of the components; and
   E. means positioned downstream from the parts feeders and mounted above the surface of the conveyor at an angle of declination in the direction of conveyor motion to provide a progressively increasing compressive force to said juxtopositioned components to join them into an integrally combined unit.

2. The apparatus as set forth in claim 1 wherein the means providing a compressive force comprises a plurality of rollers mounted above the conveyor and in line with the conveyed components and in a series succession at an angle of declination with respect to the direction of motion of the conveyor such that a progressively increasing compressive force is exerted on the juxtopositioned components as they engage each successive roller in the series.

3. The apparatus as set forth in claim 2 wherein the angle of declination is adjustable.

4. The apparatus as set forth in claim 3 wherein the angle of declination is less than 10°.

5. The apparatus as set forth in claim 4 wherein the conveyor is a chain link belt, the carrying means comprise a plurality of pins for carrying the components in axial juxtoposed orientation, and the rollers are mounted in opposing pairs on either side of a path taken by the pins on the conveyors such that substantially equal pressure is applied to the components on either side of the pin by each of the pair of rollers.

6. The apparatus as set forth in claim 5 wherein the two component unit is a vibration mount comprised of an elastomeric member and a metallic member, the elastomeric member being supplied by the first parts feeder while the metallic member is supplied by the second parts feeder.

7. Apparatus for continuous and automated assembly of vibration mounts comprised of an elastomeric member and a metallic member, said apparatus comprising in combination:
   A. an endless chain link conveyor;
   B. carrying means mounted to the conveyor at regular intervals along its length for receiving and carrying vibration mount members in a juxtoposed axial relationship;
   C. a first parts feeder positioned relative to the conveyor for feeding elastomeric members to the carrying means;
   D. a second parts feeder positioned relative to the conveyor for feeding metallic members to the carrying means in juxtoposed relationship to the elastomeric members; and
   E. means positioned downstream from the parts feeders and mounted above and at an angle with respect to the surface of the conveyor and having an entrance end and an exit end with respect to the motion of the conveyor to provide a progressively increasing compressive force to said juxtopositioned members on the carrying means from the entrance end and in the direction of the exit end to force said members into an integrally combined unit.

8. The apparatus as set forth in claim 7 wherein the means providing the compressive force comprises a series of cam rollers, the first of the rollers at the entrance end being positioned at a greater height above the conveyor than the rollers at the exit end.

9. The apparatus as set forth in claim 8 wherein the rollers at the entrance end are at an angle of declination with respect to the rollers at the exit end that is less than ten degrees.

10. Apparatus as set forth in claim 9 wherein the carrying means comprise a plurality of pins mounted on the conveyor to axially position the metallic member with respect to the elastomeric member and wherein said apparatus further comprises means mounted relative to the parts feeders for positioning said vibration mount members such that they may be successively picked up by each successive passing pin.

11. Apparatus as set forth in claim 10 wherein the rollers are mounted in opposing pairs across the path of the conveyor such that the pin carrying means pass between pairs as they travel through the series of rollers.

* * * * *